United States Patent [19]
McCarthy

[11] Patent Number: 5,619,872
[45] Date of Patent: Apr. 15, 1997

[54] STEERING WHEEL ANTI-THEFT DEVICE

[76] Inventor: Philip G. McCarthy, P.O. Box 273, Wye Mills, Md. 21679

[21] Appl. No.: 523,796

[22] Filed: Sep. 5, 1995

[51] Int. Cl.$^6$ ............................................. B60R 25/02
[52] U.S. Cl. .............................. 70/209; 70/226; 70/237; 109/29; 109/32; 109/34
[58] Field of Search ..................... 70/209, 211, 212, 70/225, 226, 237, 238, 18, 30, 49; 109/29, 30, 31, 32, 33, 34

[56] References Cited

U.S. PATENT DOCUMENTS

| | | | |
|---|---|---|---|
| 1,823,304 | 9/1931 | Weller | 109/29 |
| 1,923,979 | 8/1933 | Howett | 109/29 |
| 2,094,261 | 9/1937 | Burley | 109/32 |
| 2,306,358 | 12/1942 | Kimsey et al. | 109/32 |
| 4,061,249 | 12/1977 | Smith | 109/32 |
| 4,062,303 | 12/1977 | Fegley | 109/29 |
| 4,304,110 | 12/1981 | Fain | 70/209 |
| 4,867,076 | 9/1989 | Marcone | 109/29 |
| 5,088,165 | 2/1992 | Minasy et al. | 70/57.1 |
| 5,099,664 | 3/1992 | Wen-Yin | 70/226 |
| 5,230,232 | 7/1993 | Yang | 70/209 |
| 5,280,268 | 1/1994 | Matthews | 340/428 |
| 5,298,878 | 3/1994 | Smith | 340/426 |
| 5,333,478 | 8/1994 | Chuang | 70/209 |
| 5,388,433 | 2/1995 | Anderson et al. | 70/57.1 |
| 5,410,896 | 5/1995 | Gleason | 109/29 |

FOREIGN PATENT DOCUMENTS 8630042  5/1986  WIPO ............................ 70/237

*Primary Examiner*—Darnell M. Boucher
*Attorney, Agent, or Firm*—David L. Volk; John D. Gugliotta

[57] ABSTRACT

An apparatus is provided to prevent theft and vandalism to motor vehicles. Comprised of an adjustable bar with locking hooks which is securable across the diameter of a motor vehicle steering wheel rim, such that steering wheel movement is inhibited by physical abutment with the vehicle interior. The apparatus also includes a visual deterrent as well as a physically incapacitating chemical compound, such as tear gas, mace, or pepper spray or a combination of such, which is dispersed into the vehicle interior in the case of tampering or removal by an unauthorized user.

13 Claims, 4 Drawing Sheets

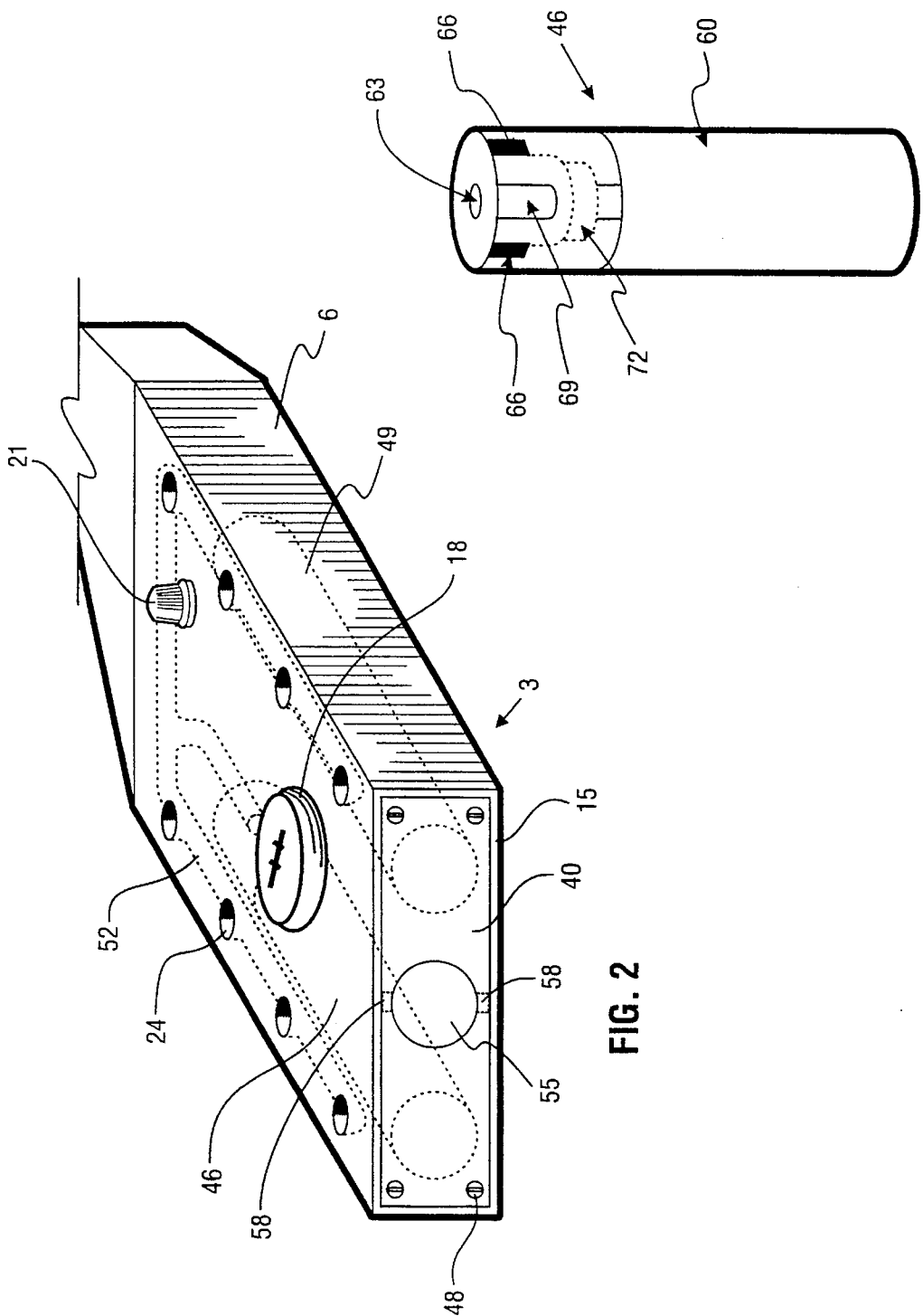

STEERING WHEEL ANTI-THEFT DEVICE

BACKGROUND OF THE INVENTION

1. Field of the Invention

The present invention relates generally to vehicle security devices and, more particularly, to devices directed to restriction of steering wheel movement and also to partially disable an unauthorized user.

2. Description of the Related Art

Automobile theft and vandalism continue to plague society every year. This fact causes great inconvenience and perhaps even mental anxiety to those whose vehicle is subject to such an attack. This fact also leads to higher costs for all persons, even those whose vehicles are not stolen through the form of higher cost insurance premiums.

While there are many related art references ranging from simple engine kill switches to multi-function electronic alarm systems, a popular type of vehicle protection is that of vehicle immobilizers. These highly visible vehicle immobilizers can take the form of many different methods. Examples of these methods are a steering wheel security device as found in U.S. Pat. No. 5,333,478 issued in the name of Chuang, and a steering wheel lock bar as found in U.S. Pat. No. 4,304,110 issued in the name of Fain. Inventions made according to these disclosures rely on the physical restraint of the steering wheel to immobilize the vehicle and prevent it from being driven away. One characteristic common to both of these disclosures is that they are of a large physical size. This characteristic leads to several disadvantages. One is that they are difficult to transport in the vehicle while the vehicle is being driven by an authorized user. Another disadvantage is that they are cumbersome to utilize which leads to situations where they are not used each and every time the vehicle is left unattended.

An attempt to correct for this foregoing problem is found in U.S. Pat. No. 5,230,232, issued in the name of Yang. While a steering wheel lock made in accordance with this disclosure relies on the same steering wheel restraint concept of the Chuang and the Fain disclosure, the steering wheel lock is of a more compact size, which allows for ease of storage in the vehicle when not in use and for the ease of utilization.

However, the Chuang, the Fain and the Yang disclosures have in common one large drawback. This drawback is that automobile steering wheels are of a construction which allows for ease of deformation in automobile accidents. Therefore no matter the construction or materials used in the restraining device itself, the entire method of protection relies on the construction of the steering wheel. This fact is exploited by thieves who physically cut or saw the steering wheel or in some cases just deform the steering wheel by applying pressure. This action then allows the thief to remove the restraining device and drive the vehicle away.

While the Chuang, the Fain and the Yang prior art devices have potential in deterring theft and vandalism, they rely on a passive defense. Such a defense poses no consequence to the thief who is unable to access the vehicle and able to simply walk away. Related art devices such as electronic alarms with loud audible horns provide additional protection only if others acknowledge them. However, with the proliferation of such systems, public apathy and even disdain have greatly reduced their effectiveness.

Numerous attempts have been made to correct for the foregoing problem by utilizing a system of active defense. For instance, U.S. Pat. No. 5,280,268, issued in the name of Matthews, discloses an auto anti-theft system. An invention made in accordance with this disclosure provides for the protection of a vehicle by common means such as a combination lock switch, the disablement of at least one critical engine function and the activation of an alarm, but it also utilizes the release or an incapacitating substance such as tear gas into the vehicle interior. While this invention does take an active defense in the protection of a vehicle it also is associated with several drawbacks. The first of these drawbacks is high cost which is associated with the complex system including the installation cost. The second of these is the inability to easily move the invention from vehicle to vehicle. And finally the third, and perhaps largest drawback is that there are minimal components which are visible, thus the invention does not provide an initial visual deterrent to potential thieves.

Additionally, U.S. Pat. No. 5,298,878, issued in the name of Smith, discloses an anti-car jacking device which also utilizes tear gas released in to the passenger compartment to provide vehicle protection and security. However, this device is only intended to prevent a certain type of vehicle theft commonly known as car-jacking and is also associated with the same disadvantages and drawbacks as the Matthews disclosure.

Consequently, a need has therefore been felt for an improved but less complex mechanism that provides for the protection and security of motor vehicles by means of an active defense system.

SUMMARY OF THE INVENTION

It is therefore an object of the present invention to provide an improved steering wheel anti-theft device.

It is another object of the present invention to provide an improved steering wheel anti-theft device which immobilizes the steering wheel to prevent the vehicle from being utilized by an authorized user.

It is yet another object of the present invention to provide an improved steering wheel anti-theft device which disperses a physically incapacitating chemical compound in the event of removal by an unauthorized user.

It is another object of the present invention to provide an improved steering wheel anti-theft device which allows for use of the invention without the physically incapacitating chemical compound at the same time concealing this fact to potential unauthorized users.

It is yet another object of the present invention to provide an improved steering wheel anti-theft device which is a small compact size to allow for the ease of use and transport when such a device is not in use.

It is another object of the present invention to provide an improved steering wheel anti-theft device which provides a high visible deterrent to potential unauthorized users.

It Is yet another object of the present invention to provide an improved steering wheel anti-theft device which can be produced by simple manufacturing means in a cost effective manner.

It is therefore a feature of the present invention to provide an improved steering wheel anti-theft device which allows for ease of installation onto any size or type vehicle steering wheel.

It is another feature of the present invention to provide an improved steering wheel anti-theft device which allows for the use of one steering wheel anti-theft device on multiple vehicles.

In accordance with a preferred embodiment, an apparatus is provided to prevent theft and vandalism to motor vehicles. Comprised of an adjustable bar with locking hooks which is securable across the diameter of a motor vehicle steering wheel rim, such that steering wheel movement is inhibited by physical abutment with the vehicle interior. The apparatus also includes a visual deterrent as well as a physically incapacitating chemical compound, such as tear gas, mace, or pepper spray or a combination of such, which is dispersed into the vehicle interior in the case of tampering or removal by an unauthorized user.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 2 is a cross-sectional view of the steering wheel anti-theft device as seen along a line 1—1 in FIG. 1;

FIG. 3 is a pictorial illustration of a physically incapacitating chemical compound canister;

DESCRIPTION OF THE PREFERRED EMBODIMENTS

1. Detailed Description of the Figures

Figure 1:
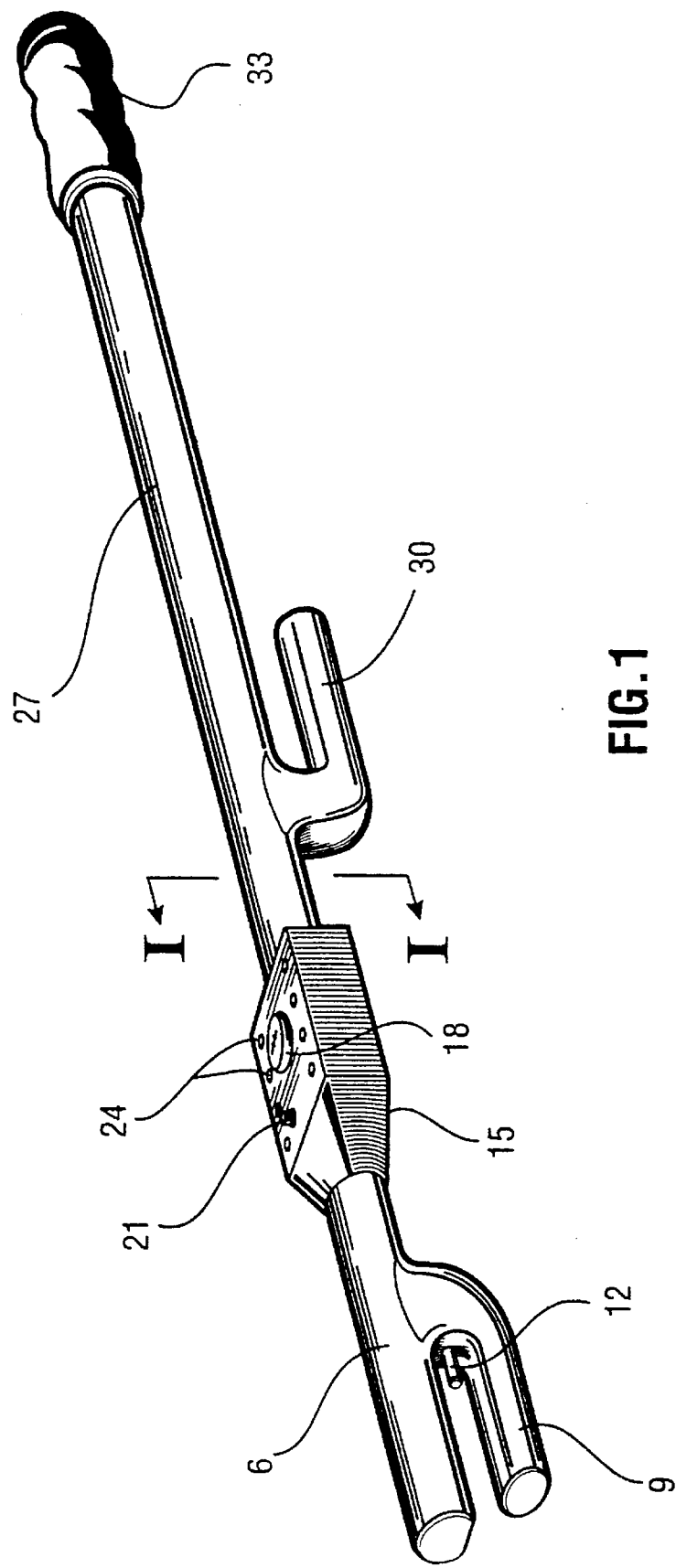
FIG. 1 is a pictorial illustration of a steering wheel anti-theft device according to a preferred embodiment of the present invention.

Referring now to FIG. 1, a steering wheel anti-theft device 3 is shown, according to the present invention. A stationary locking arm 6, is provided with a first locking hook 9 and an actuating switch 12 at the outermost extent. The stationary locking arm 6, contains a component housing 15 at the innermost extent. The component housing 15 contains an electrical arming/mechanical locking switch 18, which will be described in greater detail below, an indicating light 21, and a plurality of dispersion ports 24. Located adjacent to the stationary locking arm 6, is an adjustable locking arm 27. The adjustable locking arm 27 contains a second locking hook 30, and a protective cap 33.

Referring to FIG. 2, a cross-sectional view of the stationary locking arm 6 component of the steering wheel anti-theft device 3 is shown. The component housing 15 is in firm mechanical contact with a cover plate 40 which is secured via a removable attachment means 43, such as screws. Located in the interior of the component housing 15 is a physically incapacitating chemical compound canister 46, which will be described in greater detail below, a battery 49, and a dispersion tube 52. The dispersion tube 52 provides a fluid/gaseous pathway for the release of the physically incapacitating chemical compound canister 46 to the plurality of dispersion ports 24. On the uppermost surface of the component housing 15 is located the electrical arming/mechanical locking switch 18. The electrical arming/mechanical locking switch 18 provides for the firm mechanical securing and locking of the adjustable locking arm 27 (not shown) which would enter the component housing 15 through a hole 55. The electrical arming/mechanical locking switch 18 also provides for the actuation of the indicating light 21 and the arming of the physically incapacitating chemical compound canister 46. The cover plate 40 can only be removed from the component housing 15 when the adjustable locking arm 27 (not shown) is removed which would release locking tabs 58. The removal of the cover plate 40 would allow the user to replace the physically incapacitating chemical compound canister 46 and the battery 49. It is currently envisioned that an alternate embodiment would require the removal of the cover plate 40 from the rear, thereby adding an additional level of physical interference caused by a steering wheel to prevent tampering with the cover plate 40.

FIG. 3 shows in greater detail the physically incapacitating chemical compound canister 46. The lower part of the physically incapacitating chemical compound canister 46 is a pressurized vial 60, containing the physically incapacitating chemical compound such as tear gas, mace, or pepper spray or a combination of such. It is also currently envisioned that a marker compound, such as a U.V. detectible dye, could be added to the pressurized vial 60 in order to help identify individuals tampering with the system prior to discharge. The upper portion of the physically incapacitating chemical compound canister 46 contains on its exterior a connection port 63 for physically connecting to the dispersion tube 52 (as shown in FIG. 2), a set of electrical contacts 66 for connecting to the electrical circuit which will be described in greater detail below, and an alignment key 69 to secure the physically incapacitating chemical compound canister 46 inside the component housing 15 (as shown in FIG. 2). On the interior of the upper portion of the physically incapacitating chemical compound canister 46 is an actuating means 72, such as a solenoid valve or a small incendiary device which upon the application of a voltage from the electrical contacts 66 would allow the passage of contents of the pressurized vial 60 to the connection port 63.

Figure 4:
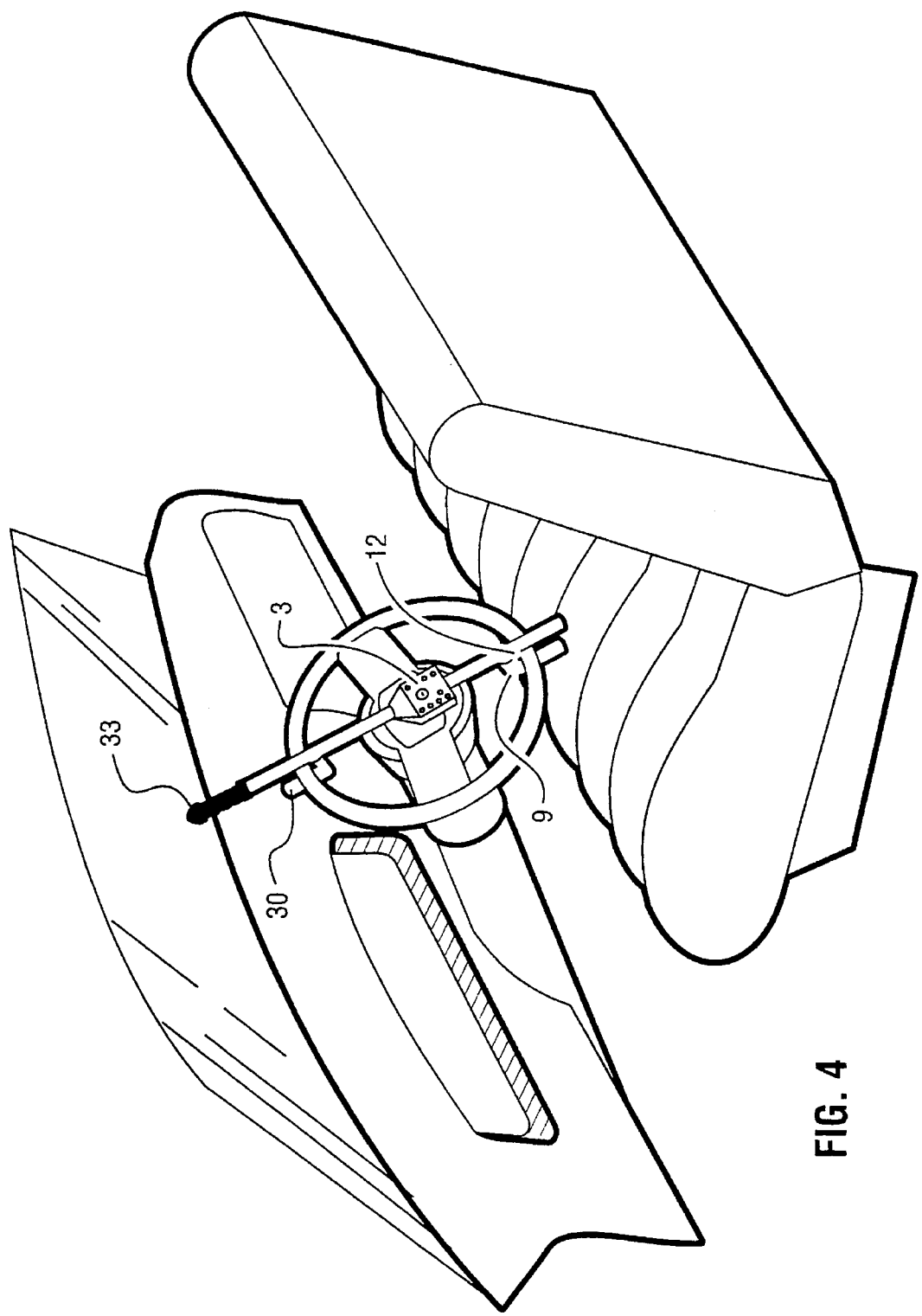
FIG. 4 is a pictorial illustration of a steering wheel anti-theft device shown in use on a typical motor vehicle.

FIG. 4 shows a pictorial illustration of the steering wheel anti-theft device 3 shown in use on a typical motor vehicle. The first locking hook 9 and the second locking hook 30 engage the steering wheel at diametrically opposite points as shown. Any attempt to drive the vehicle results in the protective cap 33 contacting the vehicle seat, floor, windshield or the underside of the roof. When the steering wheel anti-theft device 3 is installed on the steering wheel, the actuating switch 12 is held in a depressed position. This action will prohibit the release of the physically incapacitating chemical compound canister (not shown) unless any attempt is made to remove the steering wheel anti-theft device 3 by unauthorized persons.

Figure 5:
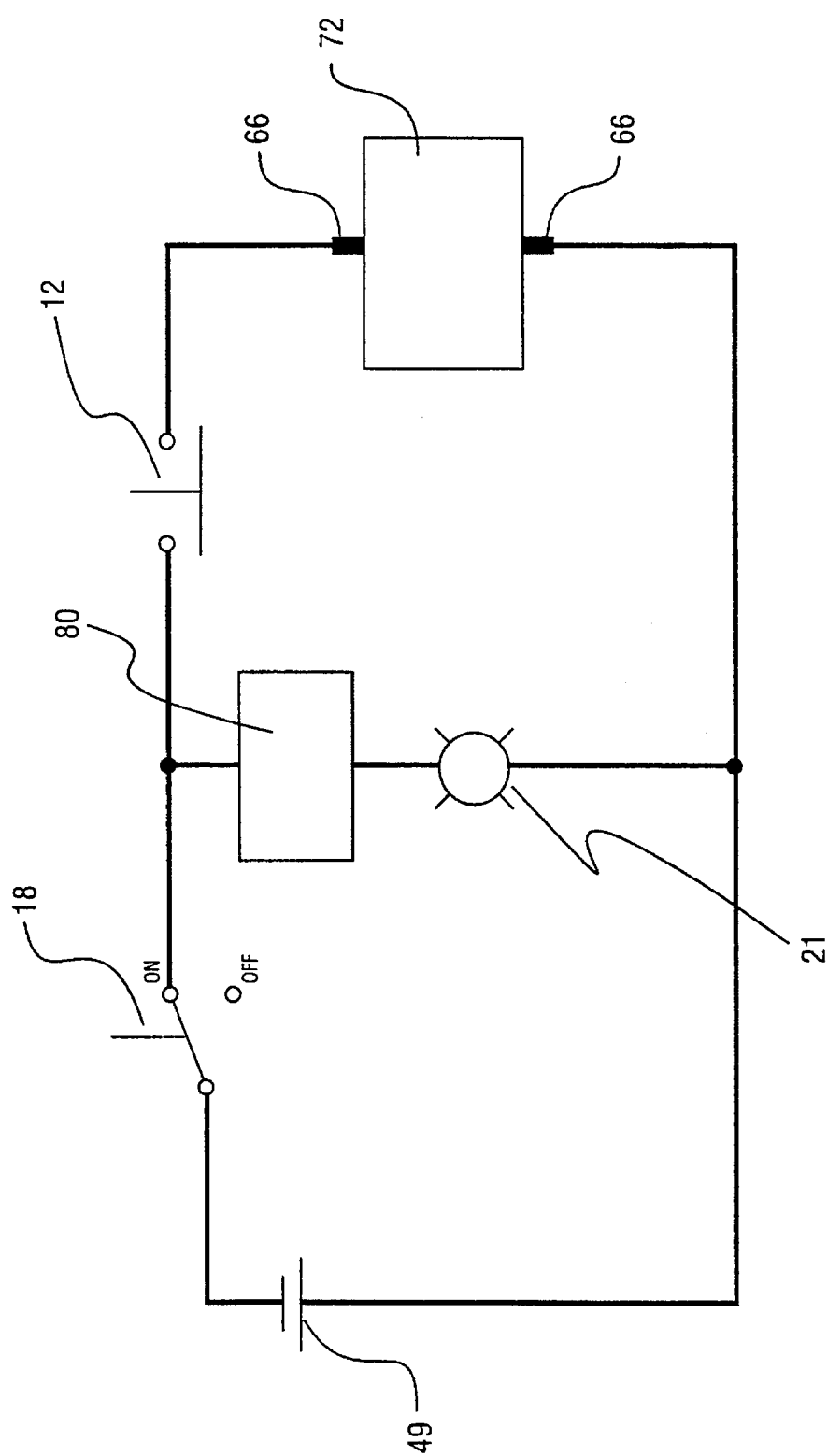
FIG. 5 is a functional electrical schematic of a steering wheel anti-theft device.

FIG. 5 shows a functional electrical schematic of the steering wheel anti-theft device 3 (not shown). The battery 49 provides electrical power through the controlling action of the electrical arming/mechanical locking switch 18. When armed, the indicating light 21 will flash through a flasher module 80, to provide a visual deterrent to any possible unauthorized users. If an attempt is made to steal the vehicle by removing the steering wheel anti-theft device 3 (not shown) the actuating switch 12 will close the circuit to the actuating means 72 by the application of voltage through the electrical contacts 66 This action will result in the dispersement of the contents of the pressurized vial 60 (as shown in FIG. 3) to the interior of the motor vehicle (as shown in FIG. 4).

It is anticipated that the main portions of the steering wheel anti-theft device 3 including the stationary locking arm 6, the first locking hook 9, the component housing 15, the adjustable locking arm 27, and the second locking hook 30 are preferably made of hardened steel to prevent cutting and bending. It is also currently envisioned that the component housing 15 could be manufactured into a larger shape in order to provide a physical obstruction from access to a vehicle airbag in those vehicles so equipped, thereby preventing theft of such a component.

2. Operation of the Preferred Embodiment

In operation, the present invention can be utilized by the common user in a simple and effortless manner. To use the present invention with its preferred embodiment can best be described in conjunction with the pictorial illustrations of the steering wheel anti-theft device as seen in FIG. 1 and FIG.4. and the functional electrical schematic of the steering wheel anti-theft device 3 as seen in FIG.5.

The user first utilizes the steering wheel anti-theft device 3 by engaging the first locking hook 9 and the actuating switch 12 at one point of the motor vehicle steering wheel. The user then slides the adjustable locking arm 27 outward until the second locking hook 30 engages the steering wheel at a point diametrically opposite that of the first locking hook 9. The user then locks and arms the device through the use of a key in the electrical arming/mechanical locking switch 18. At this point the indicating light 21 will flash to provide an indication of the battery power condition and that possible battery replacement is necessary. The indicating light 21 also provides a visual deterrent to any possible unauthorized users. If an attempt is made at unauthorized driving of the motor vehicle, the adjustable locking arm 27 and the protective cap 33 will contact the Interior of the motor vehicle and make movement impossible. If an attempt is made to remove the steering wheel anti-theft device 3 either by cutting of the steering wheel anti-theft device 3, the cutting of the steering wheel, or the deformation of the steering wheel itself, the actuating switch 12 will release and close the circuit to the actuating means 72 by the application of voltage through the electrical contacts 66. This action will result in the dispersement of the physically incapacitating chemical compound such as tear gas, mace, or pepper spray or a combination of such through the plurality of dispersion ports 24. At this point it is anticipated that the unauthorized user will flee the motor vehicle. If there is no attempt to steal the motor vehicle, when the user returns, he or she simply deactivates and releases the steering wheel anti-theft device 3 using the same key and reverse actions used to install it.

In addition, the steering wheel anti-theft device 3 can be utilized without the physically incapacitating chemical compound canister 46, as shown in FIG. 2, in areas where car theft is less of a concern. This action will provide the same level of visual and mechanical theft deterrence, because the fact that the physically incapacitating chemical compound canister 46 is not being used would be hidden from the possible unauthorized user.

The foregoing description of the preferred embodiment of the present invention has been presented for purposes of illustration and description. It is not intended to be exhaustive or to limit the present invention to the precise form disclosed, and obviously many modifications and variations are possible in light of the above teachings.

The preferred embodiment was chosen and described in order to best explain the principles of the present invention and its practical application to those persons skilled in the art, and thereby to enable those persons skilled in the art to best utilize the present invention in various embodiments and with various modifications as are suited to the particular use contemplated. It is intended that the scope of the present invention be broadly defined by the claims which follow.

What is claimed is:

1. An improved steering wheel anti-theft device comprising:

an adjustable bar, said bar having a plurality of locking hooks securable across a diameter of a motor vehicle steering wheel rim and said bar having a hollow internal cavity;

a physically incapacitating compound, said physically incapacitating compound being selected from the group consisting of tear gas, mace, and pepper spray;

a chemical compound canister for containing and storing said physically incapacitating compound, said canister housed within said hollow internal cavity and wherein said chemical compound canister comprises a pressurized vial forming the lower portion of said canister, said vial being of a size and shape compact enough to fit within said hollow cavity, an exterior connection port in fluid communication between the internal volume of said canister and the area external to said canister, and actuation means for selectively blocking and opening said exterior connection port, thereby providing a means to trigger the discharge of said physically incapacitating compound from said chemical compound canisters; and chemical discharge means for ejecting said physically incapacitating compound in an aerosol manner out from said chemical compound canister to the atmosphere immediately surrounding said adjustable bar, wherein said chemical discharge means comprises a plurality of dispersion ports penetrating through said adjustable bar and providing fluid access to said hollow internal cavity, a dispersion tube having a first end and a second end, said first end in direct connection with said exterior connection port, and said second end in connection with said dispersion ports such that a fluid/gaseous pathway exists for the release of said physically incapacitating chemical compound from said canister through said dispersion ports, a battery for providing actuating energy for said actuation means, a combination electrical arming and mechanical locking switch for providing both means for locking said adjustable bar into a fixed position, and for arming said actuation means by completing an electrical arming circuit connecting said battery to said actuation means an indicating light for illuminating when said actuation means is in connection with said battery and an actuating switch affixed to one said locking hook, said actuating switch for signaling activation of said actuation means when said locking hooks become released from their secured position across the diameter of a motor vehicle steering wheel rim.

2. An improved steering wheel anti-theft device comprising:

an adjustable bar, said bar having a plurality of locking hooks securable across a diameter of a motor vehicle steering wheel rim and said bar having a hollow internal cavity;

a physically incapacitating compound, said physically incapacitating compound being selected from the group consisting of tear gas, mace, and pepper spray;

a chemical compound canister for containing and storing said physically incapacitating compound, said canister housed within said hollow internal cavity and wherein said chemical compound canister comprises a pressurized vial forming the lower portion of said canister, said vial being of a size and shape compact enough to fit within said hollow cavity, an exterior connection port in fluid communication between the internal volume of said canister and the area external to said canister, and actuation means for selectively blocking and opening said exterior connection port, thereby providing a means to trigger the discharge of said physically incapacitating compound from said chemical compound canister wherein said actuation means comprises an electrically operated solenoid valve; and chemical discharge means for ejecting said physically incapacitating compound in an acrosol manner out from said chemical compound canister to the atmosphere immediately surrounding said adjustable bar.

3. An improved steering wheel anti-theft device comprising:

an adjustable bar, said bar having a plurality of locking hooks securable across a diameter of a motor vehicle steering wheel rim and said box having a hollow internal cavity;

a physically incapacitating compound, said physically incapacitating compound being selected from the group consisting of tear gas, mace, and pepper spray;

a chemical compound canister for containing and storing said physically incapacitating compound, said canister housed within said hollow internal cavity and wherein said chemical compound canister comprises pressurized vial forming the lower portion of said canister,said vial being of a size and shape compact enough to fit within said hollow cavity, an exterior connection port in fluid communication between the internal volume of said canister and the area external to said canister, and actuation means for selectively blocking and opening said exterior connection port, thereby providing a means to trigger the discharge of said physically incapacitating compound from said chemical compound canister wherein said actuation means comprises and incendiary valve having a port and a plug, said port providing fluid access through said valve, and said plug blocking said access, said plug having the characteristic that said plug melts upon application of an electrical current; and chemical discharge means for electing said physically incapacitating compound in an aerosol manner out from said chemical compound canister to the atmosphere immediately surrounding said adjustable bar.

4. The steering wheel anti-theft device as described in claim 1, wherein said actuation means comprises an electrically operated solenoid valve.

5. The steering wheel anti-theft device as described in claim 1, wherein said actuation means comprises and incendiary valve having a port and a plug, said port providing fluid access through said valve, and said plug blocking said access, said plug having the characteristic that said plug melts upon application of an electrical current.

6. An improved automobile anti-theft device for immobilizing a steering wheel, said device comprising:

an adjustable bar, said bar having at least one fixed locking arm and at least one adjustable locking arm, wherein said adjustable bar further comprises a component housing integral to one said fixed locking arm and wherein said component housing comprises a rigid outer shell, said outer shell having a hollow internal void, said internal void housing said chemical discharge means, and said outer shell having access opening for fee access to said internal void, a cover plate for covering said access opening arid thereby secure the contents of said housing: and removable attachment means for securing said cover plate to said outer shell;

a plurality of locking hooks, at least one locking hook affixed to each said locking arm such that said adjustable bar can be secured across and immobilize a motor vehicle steering wheel;

chemical discharge means for ejecting a physically incapacitating compound wherein said chemical discharge means comprises:

a chemical compound canister for containing and storing said physically incapacitating compound, said chemical compound canister having a pressurized vial forming the lower portion of said canister, said vial being of a size and shape compact enough to fit within said component housing;

an exterior connection port in fluid communication between the internal volume of said canister and the area external to said canister;

actuation means for selectively blocking and opening said exterior connection port, thereby providing a means to trigger the discharge of said physically incapacitating compound from said chemical compound canister;

a plurality of dispersion ports penetrating through said outer shell and providing fluid communication to said hollow internal void;

a dispersion tube having a first end and a second end, said first end in direct connection with said exterior connection port, and said second end in connection with said dispersion ports such that a fluid/gaseous pathway exists for the release of said physically incapacitating chemical compound from said canister through said dispersion ports;

a battery for providing actuating energy for said actuation means;

a combination electrical arming and mechanical locking switch for providing both means for locking said adjustable bar into a fixed position, and for arming said actuation means by completing an electrical arming circuit connecting said battery to said actuation means;

an indicating light for illuminating when said actuation means is in connection with said battery; and an actuating switch affixed to at least one said locking hook, said actuating switch for signaling activation of said actuation means when said locking hook becomes released from its secured position across the diameter of a motor vehicle steering wheel rim; and a physically incapacitating compound chosen from any combination of the group consisting of mace, tear gas, and pepper spray.

7. The steering wheel anti-theft device as described in claim 6, wherein said actuation means comprises an electrically operated solenoid valve.

8. The steering wheel anti-theft device as described in claim 6, wherein said actuation means comprises and incendiary valve having a port and a plug, said port providing fluid access through said valve, and said plug blocking said access, said plug having the characteristic that said plug melts upon application of an electrical current.

9. In a steering wheel anti-theft locking device having an adjustable bar, said bar having a stationary locking arm, an adjustable locking arm, a plurality of locking hooks securable across a diameter of a motor vehicle steering wheel, and a mechanical locking means for fixing together said adjustable locking arm and said stationary locking arm, wherein the improvement comprises:

a hollow internal cavity within and formed by said adjustable bar;

a physically incapacitating compound, said physically incapacitating compound being selected from the group consisting of tear gas, mace, and pepper spray;

a chemical compound canister for containing and storing said physically incapacitating compound, said canister housed within said hollow internal cavity wherein said chemical compound canister comprises:

a pressurized vial forming the lower portion of said canister, said vial being of a size and shape compact enough to fit within said hollow internal cavity;

an exterior connection port in fluid communication between the internal volume of said canister and the area external to said canister;

actuation means for selectively blocking and opening said exterior connection port, thereby providing a means to trigger the discharge of said physically incapacitating compound from said chemical compound and canister; and chemical discharge means for ejecting said physically incapacitating compound in an aerosol manner out from said chemical compound canister to the atmosphere immediately surrounding said anti-theft locking device wherein said chemical discharge means comprises:

a plurality of dispersion ports penetrating through said adjustable bar and providing fluid access to said hollow internal cavity;

a dispersion tube having a first end and a second end, said first end in direct connection with said exterior connection port, and said second end in connection with said dispersion ports such that a fluid/gaseous pathway exists for the release of said physically incapacitating chemical compound from said canister through said dispersion ports;

a battery for providing actuating energy for said actuation means;

an electrical arming switch in combination with said mechanical locking means for providing both means for locking said adjustable bar into a fixed position, and for arming said actuation means by completing an electrical arming circuit connecting said battery to said actuation means;

an indicating light for illuminating when said actuation means is in connection with said battery; and an actuating switch affixed to one said locking hook, said actuating switch for signaling activation of said actuation means when said locking hooks become released from their secured position across the diameter of a motor vehicle steering wheel rim.

10. The steering wheel anti-theft device as described in claim 9 wherein said actuation means comprises an electrically operated solenoid valve.

11. The steering wheel anti-theft device as described in claim 9 wherein said actuation means comprises and incendiary valve having a port and a plug, said port providing fluid access through said valve, and said plug blocking said access, said plug having the characteristic that said plug melts upon application of an electrical current.

12. In a steering wheel anti-theft locking device having an adjustable bar, said bar having a stationary locking arm, an adjustable locking arm, a plurality of locking hooks securable across a diameter of a motor vehicle steering wheel, and a mechanical locking means for fixing together said adjustable locking arm and said stationary locking arm, wherein the improvement comprises:

a hollow internal cavity within and formed by said adjustable bar;

a physically incapacitating compound, said physically incapacitating compound being selected from the group consisting of tear gas, mace, and pepper spray;

a chemical compound canister for containing and storing said physically incapacitating compound, said canister housed within said hollow internal cavity wherein said chemical compound canister comprises:

a pressurized vial forming the lower portion of said canister, said vial being of a size and shape compact enough to fit within said hollow internal cavity;

an exterior connection port in fluid communication between the internal volume of said canister and the area external to said canister;

actuation means for selectively blocking and opening said exterior connection port, thereby providing a means to trigger the discharge of said physically incapacitating compound from said chemical compound canister wherein said actuation means comprises an electrically operated solenoid valve; and chemical discharge means for ejecting said physically incapacitating compound in an aerosol manner out from said chemical compound canister to the atmosphere immediately surrounding said anti-theft locking device.

13. In a steering wheel anti-theft locking device having an adjustable bar, said bar having a stationary locking arm, an adjustable locking arm, a plurality of locking hooks securable across a diameter of a motor vehicle steering wheel, and a mechanical locking means for fixing together said adjustable locking arm and said stationary locking arm, wherein the improvement comprises:

a hollow internal cavity within and formed by said adjustable bar;

a physically incapacitating compound, said physically incapacitating compound being selected from the group consisting of tear gas, mace, and pepper spray;

a chemical compound canister for containing and storing said physically incapacitating compound, said canister housed within said hollow internal cavity wherein said chemical compound canister comprises:

a pressurized vial forming the lower portion of said canister, said vial being of a size and shape compact enough to fit within said hollow internal cavity;

an exterior connection port in fluid communication between the internal volume of said canister and the area external to said canister;

actuation means for selectively blocking and opening said exterior connection port, thereby providing a means to trigger the discharge of said physically incapacitating compound from said chemical compound canister wherein said actuation means comprises and incendiary valve having a port and a plug, said port providing fluid access through said valve, and said plug blocking said access, said plug having the characteristic that said plug melts upon application of an electrical current; and chemical discharge means for ejecting said physically incapacitating compound in an aerosol manner Out from said chemical compound canister to the atmosphere immediately surrounding said anti-theft locking device.

* * * * *